United States Patent Office 2,765,319
Patented Oct. 2, 1956

2,765,319

TREATMENT OF POLYCHLORO COPPER PHTHALOCYANINE

George Barnhart, Pencader Hundred, Del., assignor to E. I. du Pont de Nemours and Company, Wilmington, Del., a corporation of Delaware No Drawing. Application March 27, 1952, Serial No. 278,969

3 Claims. (Cl. 260—314.5)

This invention relates to a process for the treatment of crude polychloro copper phthalocyanine whereby to obtain the color in a finely divided physical form having good tinctorial qualities such as tinctorial strength, softness and freedom from grit.

Polychloro copper phthalocyanine in practice generally refers to copper phthalocyanine which has been chlorinated to very near its maximum theoretical chlorine content. The maximum theoretical content is 16 Cl atoms per molecule, or a chlorine analysis of 50.5% by weight. This ideal, however, is seldom realized in practice, and the methods customarily employed in commercial manufacture generally introduce from about 14 to about 15½ atoms of chlorine (on the average) per molecule. Accordingly, in this application, the term polychloro copper phthalocyanine shall be understood as referring to a color having a chlorine analysis of not less than 47.0%, which corresponds to 14 Cl atoms per molecule.

Several methods have been developed in the art for chlorinating copper phthalocyanine to the high stage above referred to. One of these, reacts with chlorine upon copper phthalocyanine while the latter is dissolved in a melt of a suitable inorganic flux, for instance a eutectic mixture of aluminum chloride and sodium chloride (U. S. P. 2,247,752). Other processes are of the so-called dry chlorination type. A typical example of such is the fluid-bed reactor technique described and claimed in U. S. P. 2,586,598.

In all such processes, as in nearly all cases of organic pigment manufacture, especially in the phthalocyanine field, the crude color, directly as isolated from the reaction mass, may be in the form of solid chunks or perhaps even fine, granular particles which however are too coarse and too hard for direct use as a pigment. To be suitable for incorporation into paints, varnishes and inks, the color must have a so-called pigmentary form or texture. This implies extremely fine particles, which disperse readily in oil, which are free of grit, and which develop their maximum tinctorial strength upon the ink mill with a minimum of mechanical working. (The latter property is generally referred to as "softness.")

In the case of copper phthalocyanine and metal-free phthalocyanine the first method developed, and one still very much in use, for converting the crude color into pigmentary form, is the so-called acid-pasting method. This term implies dissolving the color in concentrated sulfuric acid and then "drowning" the reaction mass in water, whereby the color precipitates in very fine, crystalline form and is filtered off. Numerous modifications of and improvements upon the acid-pasting process have been suggested in the art and are recorded in the patent literature.

Polychloro copper phthalocyanine, however, is barely soluble in concentrated sulfuric acid, and enormous quantities of the acid would be required to effect solution of a given batch from commercial operation. Consequently, the acid-pasting method per se is impractical for the treatment of the polychloro crudes.

A modification of this method has been suggested, whereby chlorosulfonic acid is added to the concentrated sulfuric acid, which increases the solubility of the polychloro compound. But the process is still not very economical, because of the relatively high cost of chlorosulfonic acid.

Another method recently suggested for the phthalocyanines in general, and especially for unchlorinated copper phthalocyanine, is the so-called acid-slurry process. In this process, sulfuric acid of lower concentration is employed, so that it is incapable of dissolving the color, but has some sort of "swelling action" thereon, most probably through conversion of the pigment into a sulfate. (British Pat. No. 503,666 and FIAT report 1313, vol. III, pages 298–303.)

Unfortunately, this process is also impractical. I have investigated this process carefully, and find that it is not commercially feasible when applied to polychloro copper phthalocyanine.

Now according to this invention, a generally applicable, practical, economical and uniformly reliable method has been developed for converting crude polychloro copper phthalocyanine into pigmentary state. This method is essentially an acid-slurry procedure, but modified according to the details indicated below, whereby to make the process successfully operative on a commercial scale.

The principal modification according to my invention is the introduction of sodium sulfate, or an equivalent salt, into the sulfuric acid mass, in quantity sufficient to saturate said mass and to precipitate therefrom colorless crystals of what appears to be an inorganic complex of sodium sulfate or sodium acid sulfate and sulfuric acid. However, the exact chemical constitution of this complex is not clear to me. Accordingly, I do not wish to limit this invention to any particular theory.

I find, however, that the presence of these crystals, preferably in amount not less than about one-third the weight of the polychloro color, and the stirring of the entire slurry in the presence of such crystals for at least about an hour, seem to be essential to the success of this invention. During this period of agitation, the color particles undergo a physico-chemical change which is probably the same change which is referred to as "swelling action" in British Pat. No. 503,666 and as "permutoid swelling" in the FIAT report above cited. The chemical change is a transformation of the phthalocyanine molecule into a sulfate thereof. The physical change can be easily followed by observation under the microscope. When a portion of the acid slurry mass is spread thin on a slide and observed under the microscope, the inorganic complex will be observed as oblong, colorless crystals, surrounded by the bluish green particles of the color. Before the process of permutoid swelling has been completed, this background of color will be heterogeneous, containing dark chunks of crude pigmemt. But when the process is complete, no dark chunks will be found, and at 100 × magnification the background will be observed as a uniform field of bright green. Presumably then, the transformation of the color into a sulfate is accompanied by a splitting up of the agglomerates into discrete crystals or particles.

In lieu of sodium sulfate, any other salt which will form $NaHSO_4$ in the acid solution may be employed, for instance acid sodium sulfate itself or sodium borate. Salts which would form water-insoluble residues (e. g., calcium sulfate) or which would liberate gas upon reaction with sulfuric acid (e. g., NaCl or $Na_2CO_3$) are to be avoided for practical reasons.

Although the quantity of salt added in any given case may be more than sufficient to saturate the acid at the given temperature, crystallization of the complex will not necessarily take place. Accordingly, where such retarded precipitation is observed, it may be corrected by "seeding" the mass with crystals of the same complex from a previous charge, or by lowering the temperature or by using both means.

The salt may be added to the slurry either before or after entry of the pigment. Or again, the acid may be added to a mixture of the salt and pigment. I suggest as a thumb-rule, based on experience, the use of a quantity of salt corresponding to between 7 and 20 parts by weight for each 100 parts of $H_2SO_4$ employed.

Another important modification which is introduced according to this invention in the aforementioned acid-slurry processes is the use of concentrated sulfuric acid, more particularly, an acid of 98%–99% strength.

The quantity of sulfuric acid employed may be from about 3 to 20 parts by weight for each part by weight of the pigment being treated. Accordingly, the treatment mass will generally have a consistency between that of a freely flowing slurry and a thick shearable magma. It is not desirable to make the mass any thicker, inasmuch as mechanical stirring or milling seems to be essential to success. The period of stirring required is that which according to observations under the microscope is sufficient to achieve complete permutoid swelling. Generally, this period will be about 1 to 12 hours. Exceeding this limit does no harm, but obviously constitutes waste of energy.

The temperature of the treatment should preferably be maintained between about 15° and 35° C. Sometimes, for the sake of bringing the sodium sulfate into solution, it may be necessary to heat the mass initially to a higher temperature, say up to 60° C. But in such events, cooling is applied as soon as solution has been achieved to bring the temperature of the mass within the range above specified. Also, after permutoid swelling has been completed, the mass may be reheated to about 50° or 60° C. to lower its viscosity. It is to be noted, incidentally, that complete solution of the salt seems to be essential. Consequently, it is the chemical complex or special allotropic form of the precipitated salt that is active, and the mere presence of sodium sulfate itself in solid form is not enough.

When the process of permutoid swelling has been completed, the reaction mass may be drowned in water (i. e., diluted to an $H_2SO_4$ concentration of about 25% or less). This step decomposes the sulfate and precipitates the free color. Filtration and drying then complete the process. Of course, the drying step may be omitted, and the press cake may be standardized for the market in paste form.

If desired, the dilution with water may be achieved in stages, with intermittent periods of stirring. For instance, the conversion mass may be diluted with water to an acid concentration of about 94%, and stirring may then be continued for several hours. This insures freedom from "microscopic grit," but is not essential.

Without limiting my invention, the following examples are given to illustrate my preferred mode of operation. Parts mentioned are by weight.

*Example 1*

Charge into a heavy duty mixer 200 parts of polychloro copper phthalocyanine and 200 parts of anhydrous sodium bisulfate. Start agitation and feed in during ½ hours 650 parts of 98% sulfuric acid. The charge will have the consistency of a heavy tar. The milling is continued for 8 to 10 hours, the mass is discharged from the mill and slurried in 3000 parts of water. The color is filtered off, washed free of acid and dried.

A pigment of superior brightness and tinctorial strength is obtained.

*Example 2*

Charge into an agitated vessel 1000 parts of 98.5% sulfuric acid and 120 parts of anhydrous sodium sulfate. Heat the charge with agitation until the $Na_2SO_4$ is dissolved. Cool to 40° C. and add 75 parts of polychloro copper phthalocyanine. Agitate for 10 hours, meanwhile cooling to 25° C. The charge will become quite viscous. It is heated to 50° C. to lower the viscosity and drowned in 10,000 parts of water. The color is filtered off, washed free of acid and dried. A pigment of superior brightness and tinctorial strength is obtained.

*Example 3*

Charge into an agitated vessel 1000 parts of 99% sulfuric acid and 120 parts of anhydrous sodium sulfate. Heat the mixture to 60° C. to dissolve the sodium sulfate. Cool to 40° C. and add 75 parts of polychloro copper phthalocyanine. Allow to cool to 28° C. and agitate two hours at 28° to 20° C. Now heat the charge to 50° C., drown in 20,000 parts of water. Filter off the color and wash acid free on the filter. A pigment of superior brightness and tinctorial strength is obtained.

*Example 4*

Charge into an agitated flask 780 parts of 98.4% $H_2SO_4$ and 73 parts of anhydrous sodium sulfate. Warm the mixture to 60° C. and agitate until solution is complete. Cool the mixture to 25° C. and add 60 parts of dry, pulverized polychloro copper phthalocyanine over a period of 10 to 15 minutes. During this addition of color there will be a temperature rise of 5° to 15° C. accompanied by thickening of the mass. The charge is agitated for 3 hours at 27° to 30° C. During this period, the whole of the color will be converted to very fine polychloro copper phthalocyanine sulfate crystals. 37 parts of water is added during 50 minutes, meanwhile holding the temperature at 30° to 42° C. by means of external cooling. The charge is then agitated for 18 hours at 30° to 40° C., drowned in 6000 parts of water at 70° C., agitated for 1 hour at 70° to 80° C., filtered and washed acid free. A pigment of superior-brightness and tinctorial strength is obtained.

It will be understood that the details of procedure may be varied considerably without departing from the spirit of this invention. Thus, while the examples hereinabove illustrate drowning of the reaction mass in large quantities of water, this is not an essential limitation upon the invention. It is sufficient if the acid slurry is diluted with water to a point where the color will be liberated from its sulfate. A dilution to about 80% $H_2SO_4$ (by weight) will generally achieve this purpose. Dilution beyond this point is optional and is governed purely by such practical considerations as ease of handling and of filtering in the available filtering medium. Acid resistant, porous, mineral filtering media are available in industry that will handle surfuric acid masses of practically any concentration. The preferred ultimate dilution, then, is a compromise between the desire to handle minimum volumes on the one hand and to use readily available or economical filtering equipment on the other hand. Numerous other variations in the details will be readily apparent to those skilled in the art.

I claim as my invention:

1. A process for improving the tinctorial qualities of crude polychloro copper phthalocyanine, which comprises producing a slurry of the color in sulfuric acid of 98% to 99% initial strength which contains solid crystals of an inorganic complex of sodium sulfate and sulfuric acid, stirring said slurry of color, acid and complex crystals, at a temperature between 15° and 35° C., for a period of time sufficient to effect permutoid swelling of the color, and subsequently recovering the color from said slurry by dilution with water and filtering.

2. A process for improving the tinctorial qualities of crude polychloro copper phthalocyanine, which comprises suspending 1 part by weight of the color in from 3 to 20 parts by weight of sulfuric acid of 98–99% initial strength, which contains further the equivalent of from 5 to 20 parts by weight of $Na_2SO_4$ for each 100 parts of $H_2SO_4$, said $Na_2SO_4$ being partly in solution and partly in the form of complex crystals suspended in the acid, stirring said slurry of color, acid and complex crystals, at a temperature between 15° and 35° C., for a period of time not less than 1 hour, to effect conversion of the color uniformly into a physico-chemical form which presents on a slide a uniform green background when examined under a microscope, and subsequently recovering the color from said slurry by diluting the latter with water and filtering.

3. A process for improving the tinctorial qualities of crude polychloro copper phthalocyanine, which comprises adding from 5 to 20 parts by weight of a sodium salt of the group consisting of sodium sulfate, sodium acid sulfate and sodium borate to essentially 100 parts by weight of sulfuric acid of 98 to 99% strength; heating the mass to a temperature sufficient to dissolve said sodium salt in said acid; cooling the mass to crystallize out an inorganic complex salt in the form of oblong, colorless crystals; adding to the resulting slurry polychloro copper phthalocyanine and stirring the resulting mixture at a temperature of 15° to 35° C., for a period of time sufficient to effect permutoid swelling of the color, and subsequently recovering the color from said mixture by diluting the latter with water and filtering.

References Cited in the file of this patent

UNITED STATES PATENTS

| | | |
|---|---|---|
| 2,278,973 | Carr | Apr. 7, 1942 |
| 2,284,685 | Detrick | June 2, 1942 |
| 2,402,167 | Lang | June 18, 1946 |
| 2,524,672 | Lecher | Oct. 3, 1950 |

OTHER REFERENCES

Fiat Report No. 1313, PB 85,172, pp. 297 and 303, vol. III.